May 9, 1933.  R. DE CAMP  1,907,517

REGULATING SYSTEM

Filed April 19, 1932  2 Sheets-Sheet 1

Fig.1.

WITNESSES:
Arthur J. McMahon
C. F. Bryant

INVENTOR
Renan DeCamp.
BY Franklin E. Hardy
ATTORNEY

May 9, 1933.   R. DE CAMP   1,907,517
REGULATING SYSTEM
Filed April 19, 1932    2 Sheets-Sheet 2

| Programs of Regulator Transfer for Increasing Load Demand ||||||
| Schedule | Unit A || Unit B || Receptacle Connections |
|   | Pri. | Sec. | Pri. | Sec. |   |
| a | 3 | 4 | 1 | 2 | $S_1-B_p$   $S_2-B_s$<br>$S_3-A_p$   $S_4-A_s$ |
| b | 2 | 4 | 1 | 3 | $S_1-B_p$   $S_2-A_p$<br>$S_3-B_s$   $S_4-A_s$ |
| c | 1 | 2 | 3 | 4 | $S_1-A_p$   $S_2-A_s$<br>$S_3-B_p$   $S_4-B_s$ |
| d | 1 | 3 | 2 | 4 | $S_1-A_p$   $S_2-B_p$<br>$S_3-A_s$   $S_4-B_s$ |
| e | 2 | 3 | 1 | 4 | $S_1-B_p$   $S_2-A_p$<br>$S_3-A_s$   $S_4-B_s$ |
| f | 1 | 4 | 2 | 3 | $S_1-A_p$   $S_2-B_p$<br>$S_3-B_s$   $S_4-A_s$ |

WITNESSES:
Arthur J. McMahon
C. F. Bryant

INVENTOR
Renan DeCamp.
BY Franklin E. Hardy
ATTORNEY

Patented May 9, 1933

1,907,517

UNITED STATES PATENT OFFICE

RENAN DE CAMP, OF WILKINSBURG, PENNSYLVANIA, ASSIGNOR TO WESTINGHOUSE ELECTRIC & MANUFACTURING COMPANY, A CORPORATION OF PENNSYLVANIA

REGULATING SYSTEM

Application filed April 19, 1932. Serial No. 606,158.

My invention relates to control-transfer systems and has particular relation to systems for automatically transferring, in accordance with a predetermined schedule, the control of a regulator from one to another of a plurality of parallel-operated electrical machines.

In copending application Serial No. 556,348, of J. H. Ashbaugh and R. A. Geiselman, filed August 11, 1931, and assigned to the Westinghouse Electric & Manufacturing Company, there is described a program-load-control system which automatically transfers the control of a regulator from one to another of a plurality of electrical generating units in accordance with changes in the total load supplied by all of the units. In that system, transfer operations, which are initiated by contact closure of load-responsive means associated with the generating unit under regulator control, are caused to proceed in accordance with a predetermined program or schedule. This schedule, as is pointed out in that application, may be planned in any manner desired, as for example, to accord with the efficiency characteristics of the several generating units involved.

It is frequently desirable, in a system of this kind, to change the sequence of control transfer in order, for example, to compensate for changes in the operating conditions of the generating units, as well as to take advantage of other considerations peculiar to the control of load distribution among parallel-operated machines. As has been mentioned, the basic program-load-control system disclosed in the copending application referred to provides for only one transfer-operation schedule, no means for changing, as at the will of an operator, the sequence of control transfer being included in the fundamental scheme as originally conceived by the inventors thereof.

I have discovered that, by properly combining with the automatic control-transfer system just referred to, suitable switching means, the sequence of transfer operations may be readily changed to thereby permit to be realized that broader adaptability incident to an adjustable or selective program feature.

It is, accordingly, one object of my invention to provide, in a program-load-control system of the type described, means whereby the sequence of transfer operations may be varied, at the will of an operator, to permit selection of any one of a plurality of different machine-loading programs.

In a control-transfer system of the type under consideration if one of the controlled machines fails to properly initiate a transfer operation, the selector equipment will stall in the position of such failure. The defect having been remedied, it is first necessary, in order to place the system back into automatic operation, to reset the equipment to the position corresponding to the condition of the transfer-initiating devices of the machines. A need for selector-device resetting means is thus created by this requirement.

An additional object of my invention, therefore, is to provide, in a system of the type described, means whereby the selector equipment may, at the will of an operator, be reset to any one of the several positions within its operating range.

In practicing my invention, I attain the program-selecting feature by providing intermediate the motor-operated selector switch of the program-load control system and the load-adjusting and load-responsive means associated with the several generating units or other electrical machines controlled, switching means whereby the connections between the selector switch and the various machine elements may be made in any desired manner so that a plurality of transfer sequence programs will be available. I have found that, to accomplish this result, a system of receptacles and plugs constitutes a very satisfactory type of switching arrangement and it is this variety of switching means that I prefer to use in the practice of my invention. As will later become more apparent, however, any other equivalent type of circuit-interchanging equipment, such as suitably interlocked switching devices, may instead be utilized if desired or found preferable.

To attain the selector-switch reset feature, I provide manually-operable control devices, such as push buttons, in the energizing circuits of the selector-switch operating motor which permit the selector switch to be reset, at the will of an operator, to any one of the several positions within its operating range.

My invention itself, together with additional objects and advantages will best be understood through the following description of a specific embodiment thereof, when taken in conjunction with the accompanying drawings, in which.

Figure 1:
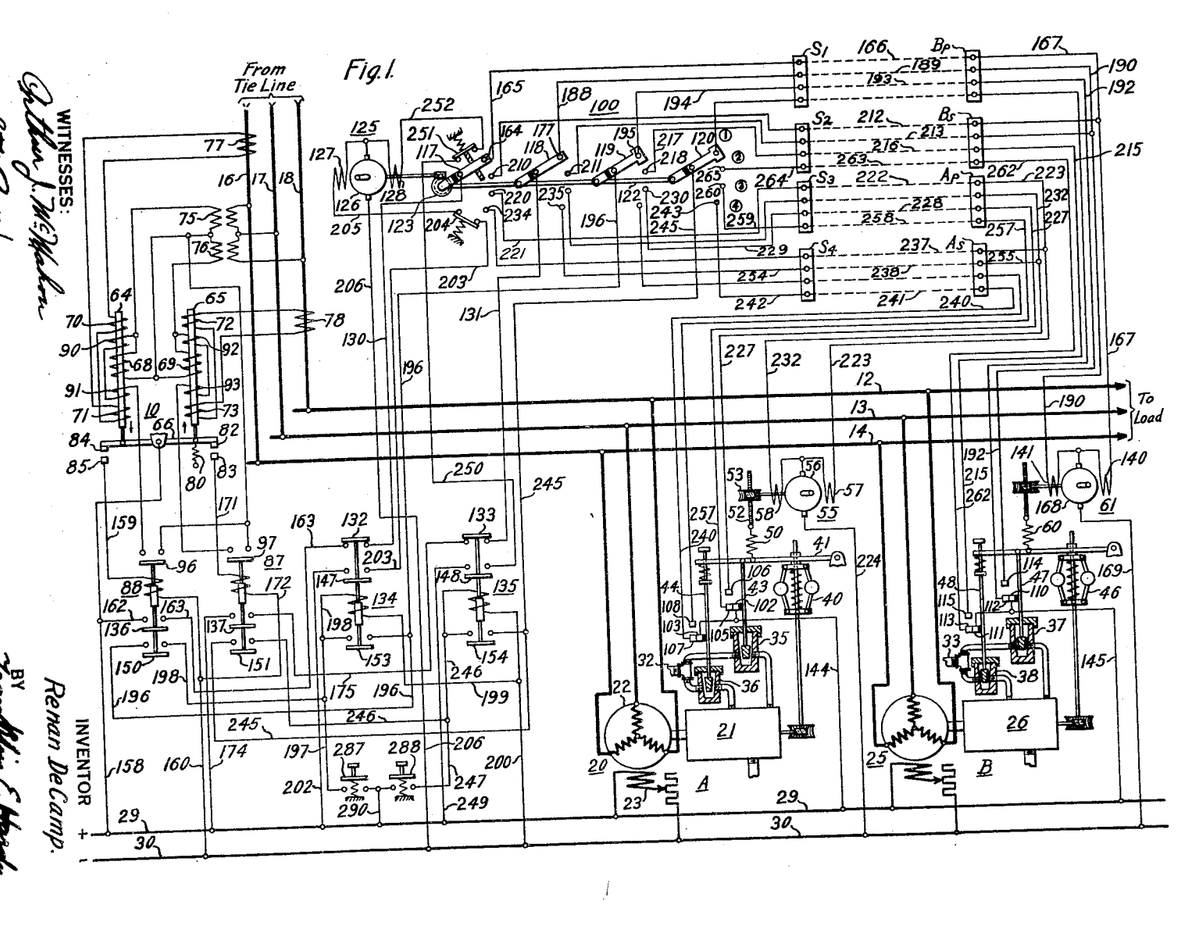
Figure 1 is a diagrammatic view of apparatus and circuits arranged in accordance with a preferred form of my invention shown as being applied to a program-load-control system for two parallel-operated, steam-turbine-driven, electrical generators which are controlled by a load regulator.

Referring to the drawings, and particularly to Fig. 1 thereof, it will be seen that the control-transfer system there illustrated is applied to two generating units A and B which are controlled by a load regulator 10.

It may here be pointed out that the automatic transfer system represented in Fig. 1, about to be described, is fundamentally the same as that shown in the drawings of the above-mentioned copending application, Serial No. 556,348, in which the transfer system is disclosed in combination with four generating units controlled by a frequency regulator. In the present case a smaller number of generating units has been chosen in the interest of simplicity of representation and description, and a load regulator has been shown instead of a frequency regulator to further emphasize that the fundamental control-transfer system of the earlier application is not limited to a single type of regulator. In fact, it may be applied when manually-operated regulating devices are utilized to control the loading of a plurality of electrical machines, as well as to situations, represented by the drawings under consideration, in which automatic regulators are utilized for this purpose.

In Fig. 1, I have illustrated the two generating units A and B disposed to supply power to a circuit, comprising conductors 12, 13 and 14, which supply energy to a load, indicated by the markings at the right of the figure, the demand of which load is assumed to be of a fluctuating nature. The main power circuit above designated is assumed to be additionally energized from some external source of power such as from a tie-line shown as terminating in conductors 16, 17 and 18.

It will be further assumed that it is desired to maintain constant the amount of power supplied from this external source. Generating units A and B may thus be utilized to supplement the tie-line source in a manner that the fluctuations in the total load will be supplied by them. In practice, as will be recognized, a power system of this type frequently results from an interconnection of two separate power sources in a manner to permit both sources to supply a common load.

As shown, generating unit A comprises an alternating-current generator 20 disposed to be driven by a prime mover 21. The generator is illustrated as being of the three-phase type, it comprising armature windings 22 and an exciting field winding 23. Similarly, generating unit B comprises a generator 25 driven by a prime mover 26.

The armature windings of the generators are connected in the manner shown to the power circuit 12—13—14. The generator field windings are illustrated as being energized by direct current derived from conductors 29 and 30 of positive and negative polarities, respectively. These conductors may be supplied from any suitable direct-current energy source (not shown).

Prime movers 21 and 26 are each illustrated in the form of a steam turbine of a well known multi-valve type which is now generally applied in large capacity installations. The turbines may be supplied with driving steam through conduits 32 and 33, respectively, from any suitable source (not shown). To control the flow of this steam in the most economical manner, a plurality of control valves are inserted in each of the conduits named.

Prime mover 21, for example, utilizes a primary valve 35 which supplies one set of steam jets and a secondary valve 36 which supplies a second set of jets. In operation, valve 36 remains closed until after valve 35 has been completely opened, at which time valve 36 also opens and causes the second set of steam jets to aid the first in driving the prime mover. In a similar manner prime mover 26 is provided with primary and secondary input control valves shown respectively at 37 and 38.

The position of the movable members of the control valves is determined by a speed-responsive governor mechanism in a well known manner. As illustrated, prime mover 21, for example, drives through a suitable mechanical connection a flyball mechanism 40 which transmits governing movements to arm 41. Arm 41 may be pivoted at one end and connected at the other end to the movable elements of input control valves 35 and 36 by means of members 43 and 44, respectively. An increase in the speed of prime mover 21 acts to move lever 41 downwardly to close the valves, while any decrease in the speed of the prime mover acts in a similar manner to open the valves and thus admit more steam.

In a similar manner prime mover 26 is provided with a flyball governing mechanism 46 which acts to control the positions of primary and secondary valve-adjusting members 47 and 48 in accordance with the speed of the prime mover. It will be understood that the output of the driven generators is directly dependent upon the input to the prime movers.

It will be observed that, as increasing load on either of the generating units causes the prime mover governing mechanism to admit more motive fluid, only the primary valve first opens, and when the set of steam jets which it supplies is operating at full capacity, the secondary valve then also starts to open to cause the second set of steam jets to supplement the first. In other words, for loadings within the range of the primary jets, the secondary jets are inactive while within the load range above full capacity of the primary jets, the secondary jets are also made active. For such a condition, input adjustment is had by changing the position of the secondary valve, the primary valve being maintained in a completely open position for loading above its full capacity.

The governing mechanism so far described is capable of maintaining the speed of the generating unit within reasonably close limits but is not sufficiently sensitive to effect the close regulation of the driven generator which, in practice, is required to attain load-distribution control. To obtain the higher precision of frequency and hence output control, each of the prime mover governors is provided with calibrating or response adjusting means.

In the case of prime mover 21, these response adjusting means are shown as comprising a tension spring 50 disposed to exert an upward pull upon lever 41. The magnitude of this pull may be adjusted by shifting the vertical position of a spring securing member 52 illustrated in the form of a threaded rod which cooperates with an interiorly threaded gear wheel 53. Rotation of gear wheel 53 moves member 52 up or down to effect a change in tension of the spring.

It will be apparent that an increase in spring tension will tend to increase the speed at which governor 40 will maintain prime mover 21, while a decrease in tension will cause the prime mover to correspondingly lower its speed, since the response characteristics of the governor are dependent upon the force which the flyball mechanism must overcome in effecting the closure of the input control valves.

To rotate gear-wheel 53, a motor 55 is provided. This motor may be of any suitable type capable of reversible operation and, as shown, it comprises an armature winding 56 and a field winding made up of two separate and oppositely wound sections 57 and 58. Energization from a direct current source of armature 56 through field winding 57 causes the motor to rotate in a direction which tends to raise the speed and output of generating unit A, while energization of the motor through field winding 58 causes it to rotate in a speed and load-lowering direction.

Prime mover 26 is similarly provided with governor calibrating means which include tension spring 60 and an adjusting motor 61. These means operate in a manner comparable to that just explained for biasing member 50 and adjusting motor 55 of prime mover 21.

To control the governor adjusting means of generating units A and B, the load regulator shown generally at 10 is employed. Regulator 10 may be of any suitable type which responds to changes in power supplied by the tie-line circuit with which it is associated. As illustrated, it is of a well known variety comprising two movable magnetic core members 64 and 65 mechanically linked with a pivotally-mounted contact-carrying member 66. In association with core members 64 and 65, respectively, are disposed potential windings 68 and 69 and pairs of current windings 70—71 and 72—73. The potential windings are energized by the voltage acting in the tie-line circuit 16—17—18 through potential transformers 75 and 76 in the manner shown, while the respective pairs of current windings are energized by current transformers 77 and 78 associated with circuit conductors 16 and 18.

The windings associated with core member 64 are so disposed that, when power flows through the tie-line circuit from the external source, there is exerted upon this member a downwardly acting magnetic force. Likewise, the windings associated with member 65 produce an upwardly acting force thereon. The intensity of these forces, which combine to tend to produce counter-clockwise rotation of contact-carrying member 66 against the action of a spring biasing member 80, varies in accordance with the amount of power supplied through the tie-line circuit from the external source.

Thus, at some intermediate value of power, regulator member 66 will be maintained in the neutral position illustrated. At lower values of power, biasing member 80 will be allowed to rotate member 66 in a clockwise direction to cause engagement of contact elements 82 and 83, while at higher values of power, the increasing magnetic forces will effect the closure of contact members 84 and 85.

The pairs of regulator contact members mentioned respectively control the actuation of two load-control relays 87 and 88 which, when actuated by the closed contact positions by energization of their operating windings, energize one or the other of load-adjusting motors 55 or 61 in the load-raising or load-lowering directions, respectively, in a manner to be further explained.

To prevent hunting of load regulator 10, anti-hunting windings are provided and arranged to be energized by the actuation of the motor control relays. These windings are illustrated at 90 and 91 in association with regulator core member 64 and at 92 and 93 in association with core member 65.

Closure of the load-raising contact members of the regulator causes to be completed, through the action of an auxiliary contact member 96 of load-control relay 88, an energizing circuit for the anti-hunting windings associated with core member 65 which act to partially neutralize the magnetic force exerted on this core to cause a premature opening of the regulator contacts. Similarly, closure of the load-lowering contact members of the regulator causes to be completed an energizing circuit for the anti-hunting windings associated with core member 65, which completion is effected by an auxiliary contact member 97 carried by load-control relay 87. It will be observed that, as illustrated, these anti-hunting windings are energized from potential transformers 75 and 76.

In order to obtain improved operating efficiency of generating units A and B, it is desirable that the load distribution between them be regulated in some predetermined manner, rather than being allowed to assume a pro rata division such as would result were load-adjusting motors 55 and 61 of the units simultaneously subjected to load changing impulses from regulator 10. Thus, as the load demand upon the main power circuit, to which generators 20 and 25 are directly connected, changes, instead of permitting the regulator to effect changes in the output of both of these generators to restore the power supplied by the tie-line circuit to the original value, it is desired that the regulator control only one of the generating units and, that after the output of this unit has been adjusted to a predetermined value, the regulator control be transferred to the other generating unit.

The control-transfer system disclosed in previously mentioned copending application, Serial No. 556,348, providing, as has been pointed out, means for transferring the control of a regulator from one to another of a plurality of generating units or other electrical machines in accordance with a predetermined schedule, is capable of effecting the load-distribution-control requirement outlined above. Such a transfer system is shown in Fig. 1 as comprising a motor-driven selector switch 100 connected intermediate the generating units A and B and the controlling regulator 10.

The control-transfer system itself will first be described, in order that the program-selecting switching means and other improvements of my invention which are applied to it may be more clearly understood.

It may first be pointed out that the program-selecting switching means of my invention are diagrammatically illustrated in the system of Fig. 1 in the form of sequence receptacles $S_1$, $S_2$, $S_3$ and $S_4$ connected with selector switch 100 and machine receptacles $B_p$, $B_s$, $A_p$ and $A_s$ connected with generating units A and B. For purposes of preliminary explanation, let it be assumed that the electrical connections indicated by the dotted lines drawn between the sequence and machine receptacles are permanently established in the manner shown. For such a condition, the control-transfer system is, in effect, the equivalent of that shown and described in the copending application mentioned, since but a single program of control transfer is available. This particular program is that given by schedule $a$ in the table of Fig. 4.

Figure 4:
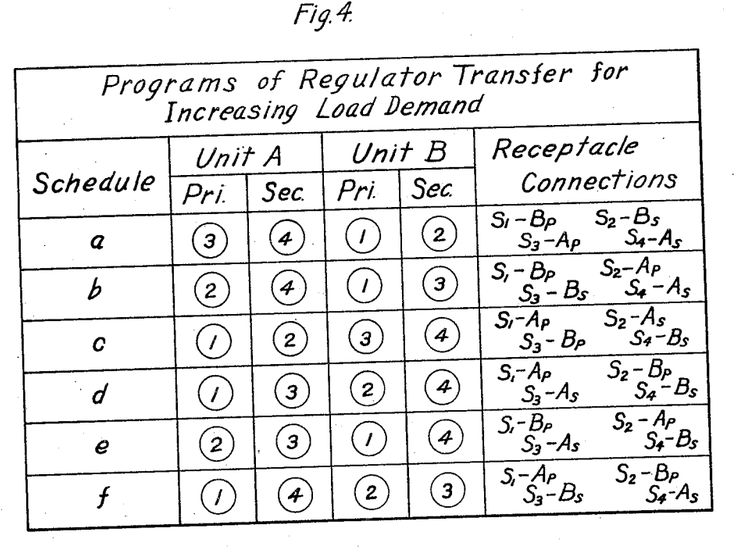
Fig. 4 is a table showing the different transfer-operation-sequence schedules which are obtainable through the use of my invention when applied to the automatic-control-transfer system shown in Fig. 1.

In the table of Fig. 4, which sets forth six different programs of regulator transfer for increasing load demand, the circle-enclosed numerals opposite each of the schedule designating letters indicate the ranges of output, defined by the input-control valve openings of generating units A and B, which the regulator is caused to consecutively make effective as the combined load demand on generating units A and B is progressively increased from a minimum to a maximum. It will be understood that load-demand changes in the load-decreasing direction cause the sequences outlined in Fig. 4 to reverse themselves.

Thus it will be seen that the particular program of regulator transfer defined by schedule $a$ of the table of Fig. 4 is as follows: Assuming that both units A and B are operating at minimum capacity, the load regulator 10 is in control of the primary-valve load range of unit B. An increase in power demand thus causes the regulator to open the primary valve of unit B. When a fully opened position of the valve is attained, a transfer operation is effected to shift the regulator control to the secondary-valve load range of unit B. Continued increase in load demand causes the regulator to open the secondary valve of unit B, which, when fully opened, causes regulator control to be transferred to the primary-valve load range of unit A. Additional increase in load demand now causes the regulator to open the primary valve of unit A. Complete openings of the primary valve effect a transfer operation which shifts the regulator control to the secondary-valve load range of unit A. In this condition unit B is operating at full capacity and the output of unit A is being controlled within the upper range of unit capacity.

A decrease in the load demand of generating units A and B will be seen to cause the transfer operations to take place in a sequence which is the reverse of that just stated.

Initiation of transfer operations may, as is pointed out in the copending application referred to, be effected in any suitable manner by means responsive to the loading of each of the several generating units involved. In practice, it is found preferable to utilize for this purpose contact-making mechanisms operated in accordance with the position of the prime-mover input-control valves, rather than wattmetric contact-making means disposed in the output circuits of the generators. I have, accordingly, illustrated such input-valve-operated mechanisms in the system shown in Fig. 1.

On the movable member of each input control valve is mounted a contact member in cooperative relation with which two or more stationary members are positioned so that they may be selectively engaged by the first-named member as the valve is adjusted from the open to the closed position. Electrical connections are made from these contact members to the control circuits of transfer-operation effecting means.

Thus in the case of generating unit A, contact members 102 and 103 are mounted upon the movable elements of primary and secondary valves 35 and 36, respectively. In cooperative relation with member 102 are disposed stationary contact members 105 and 106. Stationary contact members 107 and 108 are similarly disposed with respect to movable contact member 103 of secondary valve 36. As shown, the positioning of the stationary members is such that, when the valves are in the completely closed positions illustrated, the movable contact members engage stationary members 105 and 107, respectively, while, when the valves are in the completely open positions, the movable contact members carried thereby engage stationary members 106 and 108, respectively.

In a similar manner, the primary and secondary valves of generating unit B are provided with contact members 110 and 111, which, in the completely closed positions of the valves engage stationary members 112 and 113, respectively, while in the completely opened positions of the valves, members 114 and 115 are similarly engaged thereby.

The motor driven selector switch 100 comprises four parallel-operated face plates or multi-point switching devices shown generally as comprising independent contact arms 117, 118, 119 and 120, each of which is disposed to selectively engage a plurality of stationary contact points. All of these arms are mechanically connected to a common shaft 122 which carries a gear-wheel 123 which is disposed to be rotated by a motor 125.

Two of the selector-switch contact arms, 117 and 118 in the system of Fig. 1, are utilized for the purpose of routing the load-raising and load-lowering impulses, respectively, of regulator 10 from one to another of the generating units, while the other two contact arms of the switch, 119 and 120, are similarly utilized to respectively route the load-demand-increasing or forward and the load-demand-decreasing or reverse control circuits of the switch-operating motor 125 among the generating units.

Motor 125 may be of any suitable type capable of reversible operation and is illustrated as comprising an armature winding 126 and two oppositely wound field windings 127 and 128. Energization from a direct-current source of the armature winding through field winding 127 causes the motor to rotate in a forward direction to move the several contact-making arms of the selector switch in a clockwise rotative direction, while energization of the motor through field winding 128 moves the contact-making arms in a backward or counter-clockwise direction. In the system of Fig. 1 motor energization in the forward and reverse directions is respectively controlled by means of relays 134 and 135, which may be designated as transfer-control relays.

Contact-making arms 117 and 118 of the selector switch are connected to the regulator-actuated load-control relays 88 and 87, respectively, by means of conductors 130 and 131, the circuits also respectively including contact members 132 and 133 carried by the transfer-control relays 134 and 135. It will be observed that the actuation of load-raising control relay 88 thus connects, through a contact member 136 carried thereby, the contact-making arm 117 of the selector switch 100 to positive-control conductor 29. In a similar manner, actuation of load-lowering relay 87 connects, through a contact member 137, contact-making arm 118 of selector switch 100 to the positive-control conductor.

To the several stationary contact points respectively engaged by contact-making arms 117 and 118 are brought connections from the load-adjusting motors 55 and 61 of generating units A and B, the load-raising connections being brought to the points associated with arm 117, and the load-lowering connections being similarly brought to the points associated with arm 118.

The armature windings of load-adjusting motors 55 and 61 are connected to negative-control conductor 30 by means of conductors 224 and 169, respectively. Thus there may be selectively completed for either of these motors an energizing circuit which extends from the positive control conductor through the auxiliary relays, the selector switch contact-making arm 117 or 118, and the windings of the motor back to the negative-control conductor.

The transfer-control relays 134 and 135, mentioned as controlling the operation of selector-switch adjusting motor 125, in the forward or increasing-load-demand and reverse or decreasing-load-demand directions, respectively, serve to complete, when in the actuated position, motor energizing circuits through contact members 147 and 148. Energization of the actuating windings of these transfer-control relays is effected by the engagement of a set of valve-operated contact members on one of the generating units A or B, selection of the particular set of members which will be effective being determined by the position of contact-making arms 119 and 120 of the selector switch.

To deenergize the regulator control circuit during transfer operations so that undesirable arcing at the transfer switch contacts may be prevented, the previously mentioned contact members 132 and 133 are provided on the transfer-control relays 134 and 135. It will be seen that actuation of either one of these relays, which occurs during a transfer operation, interrupts the energizing circuit for the load-adjusting motor of the generating unit which might at the time be completed by action of the load regulator 10.

In the arrangement of the auxiliary relays shown in Fig. 1, before a transfer operation can be effected, it is necessary that the valve-actuated contacts of the generating unit then in control properly engage and, in addition, that the regulator simultaneously close its contacts to initiate a load-change operation. It will be observed that the energizing circuit for transfer-control relay 134, for example, can be completed only when a contact member 150, carried by load-control relay 88, is in the actuated position, and similarly, that an energizing circuit for the actuating winding of transfer-control relay 135 can be completed only when a similar contact member 151, carried by load-control relay 87, is closed.

Once a transfer operation has been initiated, however, an opening of the regulator contacts should not interrupt it, otherwise the selector equipment might become stalled in an off-contact position. To ensure uninterrupted energization, the transfer-control relays 134 and 135 are provided with self-locking contacts 153 and 154, which will be seen to bridge the interlocking contacts 150 and 151 of the load-control relays. This arrangement is the same as that shown and claimed in copending application Serial No. 606,200 by A. P. Hayward and T. E. Purcell, filed April 19, 1932 and assigned to the same assignee as this invention.

Before attempting to explain the details of the program-selecting means of my invention, it will be helpful to first consider the manner of operation of the complete control-transfer system with which such means are shown as being combined in Fig. 1. The operation, of course, is fundamentally the same as that already explained in the copending application before mentioned; however, the differences in the number and type of machines controlled, as well as certain changes in the system of auxiliary relays, make it desirable that such an operation explanation be included in this specification.

Let it be assumed that generating units A and B are both being operated at exceedingly low values of load. For such a condition, the contact-making arms of the selector switch 100 will be in the position shown, or in engagement with the stationary contact points at the top of the switch representation. As designated by the numerals enclosed in the small circles near the right-hand end of the switch, this is position No. 1 and constitutes the limit of switch travel in the reverse or load-diminishing direction.

Load regulator 10 is, for this condition, in control of generating unit B. An increase in the load demand upon both generators thus causes generating unit B only to raise its output, since the load regulator acts only upon the load-adjusting motor of this unit. Load fluctuations within the range of primary-valve capacity of generating unit B result in no change in the position of selector switch 100, as will presently be made evident, and the load regulator is free to operate load-adjusting motor 61 in the usual manner.

In the system shown, this operation will be seen to occur as follows: an increase in the demand of the fluctuating load supplied by power circuit 12—13—14 causes the external source to supply more power through tie-line circuit 16—17—18. This increase closes contact members 84 and 85 of load regulator 10 and completes an energizing circuit for raise load-control relay 88 which extends from positive-control conductor 29 through conductor 158, regulator contact members 84 and 85, conductor 159, the winding of relay 88 and conductor 160 back to negative-control conductor 30.

In actuating its contact members upwardly, relay 88 completes a circuit for energizing motor 61 of generating unit B in the load-raising direction, which circuit extends from positive-control conductor 29, through conductor 158, conductor 162, relay contact member 136, conductor 163, normally-closed contact member 132 of relay 134, conductor 130, contact-making arm 117 and stationary contact point 164 of selector switch 100, conductor 165, jumper connection 166, conductor 167, the field and armature windings 140 and 168 of motor 61, and conductor 169 back to negative control conductor 30. Thus energized, motor 61 adjusts the governor of prime mover 26 in a manner that the output of generator 25 is increased.

In a similar manner, a decrease in the load demand causes regulator 10 to close contact members 82 and 83 to complete an energizing circuit for lower load-control relay 87 which extends from positive-control conductor 29 through conductor 158, regulator contact members 82 and 83, conductor 171, the actuating winding of relay 87, and conductors 172 and 160 back to negative control conductor 30. Relay 87 is thus actuated to complete a circuit for energizing motor 61 of unit B in the load-lowering direction. This circuit extends from positive-control conductor 29, through conductor 174, contact member 137 of relay 87, conductor 175, normally-closed contact member 133 of relay 135, conductor 131, contact-making arm 118 and stationary contact point 177 of selector switch 100, conductor 188, jumper connection 189, conductor 190, the field and armature windings 144 and 168 of motor 161, and conductor 169 back to negative control conductor 30. Thus energized, motor 61 adjusts the governor of generating unit B in the load-lowering direction.

Assuming that the load demand on the main power circuit increases to the extent that the regulator is caused to move primary valve 37 of generating unit B to the completely open position, contact member 110, carried by the valve, in engaging member 114, to initiate a control-transfer operation by setting up an energizing circuit for forward transfer-control relay 134, which circuit may be completed by the actuation of raise load-control relay 88. This circuit extends from positive-control conductor 29 through conductor 145, contact members 110 and 114, carried by primary valve 37 of unit B, conductor 192, jumper connection 193, conductor 194, stationary contact point 195 and contact-making arm 119 of selector switch 100, conductor 196, contact member 150 of relay 88 closed during load-raising impulses from regulator 10, conductor 198, the actuating winding of relay 134 and conductors 199 and 200 back to negative control conductor 30.

Thus energized, relay 134 actuates its contact members upwardly, locking itself in through contactor 153 which bridges contact member 150 of relay 88. The closure of contact member 147 of relay 134 completes an energizing circuit for selector-switch-operating motor 125, which extends from positive-control conductor 29, through conductor 202, relay contact 147, conductor 203, a limit switch 204, conductor 205, field and armature windings 127 and 126 of motor 125, and conductor 206 back to negative control conductor 30.

Thus energized, motor 125 rotates in the forward direction to move selector switch 100 in a clockwise or load-demand increasing direction to position No. 2, energization of the motor continuing until contact-making arm 119 of the switch leaves stationary contact point 195 at which time the energizing circuit for transfer-control relay 134 is interrupted and the motor is thus caused to stop. The width of contact-making arms 119 and 120 is such that they maintain the transfer-control relays energized until the switch has been shifted to the succeeding position, when interruption takes place.

In the new or No. 2 position of the selector switch, the several contact-making arms are in engagement with the second stationary contact points from the top of the switch representation. It will be observed that the load regulator is still in control of load-adjusting motor 61 of generating unit B, since the leads from this motor, 167 and 190, are respectively connected to contact points 210 and 211 through circuits which include jumper connections 212 and 213. Therefore, the operation of regulator 10 in its control of the loading of generating unit B is unchanged, except for the fact that further increases in load demand will cause the opening of secondary valve 38, primary valve 37 being maintained in the completely opened position.

Continued increase in load demand, therefore, will cause the regulator to effect a progressive opening of the secondary valve 38 of unit B and, when the completely opened position is reached, another transfer operation will be initiated by the engagement of valve carried contact member 111 with contact member 115. The energizing circuit thereby set up extends from positive control conductor 29, through conductor 145, contact members 111 and 115, conductor 215, jumper connection 216, conductor 217, stationary contact point 218, contact-making arm 119 of selector switch 100, and conductor 196 to negative control conductor 30 through the winding of selector switch motor control relay 134, the latter portion of this circuit having already been traced.

Relay 134 acts in the manner already explained to energize motor 125 in the forward direction and thus causes selector switch 100 to be moved to the next or No. 3 position in a clockwise or load-demand increasing direction. In this new position, the load regulator is in control of generating unit A, which unit it will be noted has, prior to this transfer operation, been maintained in a low load condition, it supplying but very little energy to the load circuit. Generating unit B, on the other hand, has been loaded, by regulator action, from the minimum value up to the full capacity value in which both the primary and secondary valves are in the completely opened position, in which position they remain for all further increases in total load demand.

Additional increase in load demand now causes load regulator 10, by actuating load-control relay 88 to the closed position in the manner already explained, to energizing load-adjusting motor 55 of generating unit A through a circuit which extends from positive-control conductor 29, through conductors 158 and 162, contact member 136 of relay 88, conductor 163, contact member 132 of relay 134, conductor 130, contact-making arm 117 now in engagement with contact point 220 of selector switch 100, conductor 221, jumper connection 222, conductor 223, the field and armature windings 57 and 56 of motor 55, and conductor 224 back to negative-control conductor 30.

Thus energized, motor 55 adjusts the governor of generating unit A in the load-raising direction. As a result, the governor acts to open primary valve 35 of prime mover 21 by an amount necessary to take care of the increased load.

Continued increase in load demand thus causes primary valve 35 of unit A to be adjusted to a completely open position, thereby causing another control-transfer operation to be initiated by the engagement of contact member 102, carried by the valve, with stationary member 106. This engagement sets up an energizing circuit for transfer-control relay 134 which extends from positive-control conductor 29 through conductor 144, contact members 102 and 106, conductor 227, jumper connection 228, conductor 229, contact point 230 and contact making arm 119 of selector switch 100, and thence to negative-control conductor 30 through the hereinbefore traced circuit which includes the winding of relay 134.

In actuating, relay 134 causes motor 125 to shift transfer switch 100 in the load-demand increasing direction to the succeeding or No. 4 position, in a manner already explained.

The contact-making arms of the selector switch now being in engagement with the contact points shown at the bottom of the switch representation, regulator 10 is still in control of generating unit A since it will be observed that the leads 223 and 232 from governor adjusting motor 55 are connected with contact points 234 and 235 through circuits which respectively include jumper connections 237 and 238. The regulator now acts in the usual manner to control the output of generating unit A by varying the amount of opening of secondary valve 36.

The transfer equipment will remain in any one of the several positions including, of course, the present one, position No. 4, as long as the load fluctuations do not cause the generating unit under regulator control to change its output beyond the limits of the range of input-control-valve adjustment.

The transfer operations resulting from a continuous increase in load demand from minimum to maximum capacity of generating units A and B having been described, attention may now be directed to the operations which result from a continuous change in load demand in the opposite or decreasing direction. It will be observed that such transfer operations will be caused to take place in a sequence which is the reverse of that explained above.

With the transfer-switch in position No. 4, a load-lowering impulse from the regulator actuates relay 87, in the manner already explained, and thereby establishes a load-lowering energizing circuit for motor 55 of generating unit A. This circuit extends from positive control conductor 29 through conductor 174, contact member 137 of relay 87, conductor 175, contact member 133 of relay 135, conductor 131, contact making arm 118 and contact point 235 of selector switch 100, conductor 254, jumper connection 238, conductor 255, conductor 232, field and armature windings 58 and 56 of motor 55 and conductor 224 back to negative control conductor 30. Thus energized, motor 55 adjusts the governor of prime mover 21 in the load-lowering direction in a manner that valve 36 will be moved toward the closed position.

Thus a decrease in load demand, which causes secondary valve 36 of generating unit A to move to the completely closed position, initiates a transfer operation in the reverse or load-lowering direction as a result of the engagement of valve-carried contact member 103 with member 107. The circuit thereby set up, which energizes the reverse transfer-control relay 135, may be traced from positive-control conductor 29 through conductor 144, contact members 103 and 107, conductor 240, jumper connection 241, conductor 242, contact point 243 and contact-making arm 120 of selector switch 100, conductor 245, contact member 151 of lower regulator relay 87 closed when regulator 10 furnishes a load lowering impulse, conductor 246, the winding of relay 135 and conductor 200 back to negative-control conductor 30.

Thus energized, relay 135 actuates its contact members upwardly, completing through member 154 a holding-in circuit, and through member 148 an energizing circuit for motor 125 of the selector switch. This latter circuit may be traced from positive control conductor 29, through conductor 249, contact member 148 of relay 135, conductor 250, a limit switch 251, conductor 252, the field and armature windings 128 and 126 of motor 125, and conductor 206 back to negative-control conductor 30.

Motor 125 operates the selector switch in the reverse direction, causing the contact making arms to move into engagement with No. 3 contact points, the actuating circuit for relay 135 being interrupted when arm 120 disengages from contact point 243. This interruption causes motor 125 to be deenergized and to stop when the selector switch arms are in position No. 3.

In this position of the selector switch, it will be seen that the regulator is still in control of generating unit A and can adjust the output of the unit within the range defined by the opened and closed positions of primary valve 35 without initiating further transfer operations.

Further decrease in load demand thus causes regulator 10 to adjust the governor setting of unit A and when primary valve 35 has been moved to the closed position, in which contact member 102 engages with member 105, there will be initiated another transfer operation. The operation-initiating circuit may be traced from positive control conductor 29 through conductor 144, contact members 102 and 105, conductor 257, jumper connection 258, conductor 259, contact point 260 and contact-making arm 120 of selector switch 100, and thence to negative-control conductor 30 through a circuit already traced as including the operating winding of reverse transfer-control relay 135.

Relay 135 acts in the manner before explained to energize motor 125 in the reverse direction. The motor thus moves the selector switch in the load-demand decreasing direction to position No. 2, energization of the motor being discontinued when contact-making arm 120 disengages from contact point 260.

In position No. 2 of the selector switch, it will be observed that the regulator control has been transferred to unit B and is free to adjust the output of this unit within a range determined by the secondary valve 38 of prime mover 26 without initiating further transfer operation.

Further decrease in load demand thus causes regulator 10 to operate motor 61 in a manner to cause secondary valve 38 of generating unit B to be moved toward the closed position. When the closed position is reached, contact member 111, carried by the valve, engages member 113, thereby setting up a circuit for operating the selector switch, which circuit may be traced from positive control conductor 29 through conductor 145, contact members 111 and 113, conductor 262, jumper connection 263, conductor 264, contact point 265, and contact making arm 120 of the selector switch and through the operating winding of relay 135 as previously traced to negative control conductor 30.

Relay 135 acts, as before explained, to energize motor 125 in a manner to cause it to operate selector switch 100 in the reverse direction, causing the contact making arms to shift engagement from contact points No. 2 to points No. 1 or to the position illustrated in Fig. 1.

In this new position, the regulator is in control of generating unit B and can vary the output of this unit within the range determined by primary valve 37, as has been previously explained.

It is apparent that only a single program of regulator transfer is available in the fundamental control system just explained, this particular program having been described in detail for the system shown in Fig. 1 when the jumper connections, indicated by the dotted lines are made in the manner shown. To provide means for changing the sequence of transfer operation at the will of an operator, I contemplate, as has already been pointed out, the provision of switching means intermediate the selector switch of the transfer system and the machines controlled.

As has been mentioned, one preferred form of such switching means is diagrammatically illustrated in Fig. 1, it including a set of sequence receptacles $S_1$, $S_2$, $S_3$ and $S_4$, and a corresponding set of machine receptacles $B_p$, $B_s$, $A_p$ and $A_s$, together with interchangeable jumper connections (indicated by the dotted lines of the diagram).

It will be observed that, in the system of Fig. 1, sequence receptacles $S_1$, $S_2$, $S_3$ and $S_4$ are respectively connected with the stationary contact points which occupy the first, second, third and fourth positions of the selector switch 100. The machine receptacles $B_p$ and $B_s$ will likewise be seen to receive the connections from the primary and secondary valve contacts of generating unit B respectively, while machine receptacles $A_p$ and $A_s$ are connected with the primary and secondary valve contacts of generating unit A, the receptacles $B_p$ and $B_s$ both being connected with the load-adjusting motor of generating unit B, and receptacles $A_p$ and $A_s$ both being connected with the load-adjusting motor of generating unit A. It is thus apparent that the sequence of regulator control transfer may be readily made in practically any desired manner by suitably interconnecting the sequence and the machine receptacles.

Figure 2:
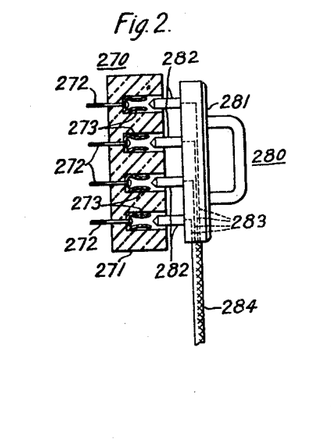
Fig. 2 is a side elevational view, partially in section, showing the construction of a receptacle and a cooperating plug member of a type suitable for use by the program-selecting-switching arrangement utilized in the control-transfer system shown in Fig. 1.

In practice, the stationary receptacle members may be of any suitable type well known in the art, such, for example, as is illustrated in Fig. 2 at 270.

The receptacle member there shown comprises a block of insulating material 271 which carries a plurality of conductor terminals 272 communicating with contact making clips 273 mounted in the insulating block in some suitable manner, such as is illustrated. It will be understood that the control-circuit conductors of the transfer system shown in Fig. 1 are joined with terminals 272 when each of the sequence and machine receptacles is of the type shown at 270 in Fig. 2, or its equivalent.

In order to provide a convenient and reliable means for establishing the removable jumper connections, indicated in the system of Fig. 1 by the dotted lines, I provide a removable plug device 280, a side elevational view of which is also indicated in Fig. 2.

This plug device may be of any well known type. As shown, it comprises a block of insulating material 281 from which project a plurality of conducting material studs 282 which are disposed to fit snugly into the clip members 273 of the stationary receptacle when a plug member is inserted therein.

Electrical connections from studs 282, indicated in Fig. 2 at 283, may be made in well known manner and brought out from the plug in the form of a flexible cord 284, which cord terminates in a similar plug member 280' (Fig. 3) which is provided with an equal number of contact studs symmetrically connected to those of the first-mentioned plug. That is, the top studs of the two interconnected plugs are joined together, the second stud from the top of both plugs similarly connected, and so on. The flexible cord 284 thus comprises a plurality of separately insulated conductors, the two ends of each of which terminate in similarly positioned studs in the plug members.

Figure 3:
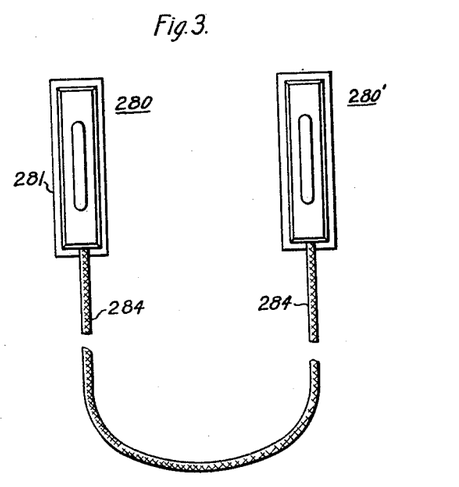
Fig. 3 is a front elevation of two interconnected removable plug members which form a part of the program selecting means of this invention.

In the system of Fig. 1, it will be apparent that four of the plug connecting assemblies of the type shown in Figs. 2 and 3 will be required to establish the jumper connections between the sequence and the machine receptacles. When these connections are established in the manner shown in Fig. 1, the program of transfer operations is that already explained as being given by schedule $a$ in the table of Fig. 4, the receptacle connections being indicated in the last column of this table.

Through the use of the program selecting switch means of my invention, the sequence and the machine receptacles may be connected in other manners so that the additional schedules identified by $b$, $c$, $d$, $e$ and $f$, in the table of Fig. 4, are available when the receptacles are interconnected in the manners indicated in the last column of the table.

Considering schedule $b$, for example, it will be seen that to set up this particular schedule, receptacle $S_1$ is connected with $B_p$, receptacle $S_2$ with $A_p$, receptacle $S_3$ with $B_s$, and receptacle $S_4$ with $A_s$. As is indicated in the table, this schedule provides that, for increasing load demand, the regulator is first in control of the primary valve of generating unit B, is then transferred to the primary valve of generating unit A, thence to the secondary valve of unit B, and from there to the secondary valve of unit A.

The remaining schedules are felt to be presented with sufficient clarity in the table of Fig. 4 to require no further explanation.

As was mentioned in an early portion of this specification, in a program load-control system of the type under consideration, a failure by one of the electrical machines to properly initiate a control-transfer operation will cause the selector equipment to stall in the position of such failure, and further automatic operation of the transfer device will be rendered impossible for the reason that the transfer initiating circuits cannot be completed. In such an event, there is likelihood that the controlled machines may get out of step with the transfer switch. For this condition, the mere repair of the defective transfer-initiating means of the machine may thus be found inadequate to place the transfer system back into operation.

Before normal operating conditions can be resumed, it is necessary to synchronize the transfer switch with the machine loading conditions or, in a system of the type shown in Fig. 1, with the valve positions of the generating-unit prime movers. As a solution for this particular problem, I provide means for resetting the selector switch to any one of the several positions within its complete operating range. Such means are shown in the system of Fig. 1 in the form of manually-operable push buttons 287 and 288 connected in the energizing circuit of the forward and reverse transfer-control relays respectively.

When it is desired that the position of the selector switch be reset or adjusted at the will of an operator, one or the other of the push buttons may be depressed. Thus, the operation of push button 287 completes an energizing circuit for transfer-control relay 134 which extends from positive-control conductor 29 through conductor 290, the push button 287, conductors 197 and 198 the winding of relay 134 and conductors 199 and 200 back to negative control conductor 30. Relay 134 may thus be maintained in the actuated position for as long a period as is desired so that the energizing circuit for running motor 125 in the forward direction may be maintained until the desired shift in position of selector switch 100 in the load-demand-increasing direction is attained.

Similarly, a depression of push button 288 energizes transfer-control relay 135 through a circuit which may be traced from positive control conductor 29, through conductor 290, the push button 288, conductors 247 and 246, the winding of relay 135, and conductor 200 back to negative control conductor 30. Thus relay 135 may be actuated to complete an energizing circuit for motor 125 which runs it in the direction to shift the position of selector switch 100 in the reverse or load-demand-decreasing direction.

It will thus be seen that, through the use of these push buttons, an operator is enabled to set the selector switch in any position desired, such as to correspond to any particular valve-position combination of the generating units controlled.

Although I have shown and described a certain specific embodiment of my invention, I am fully aware that many modifications thereof are possible. My invention, therefore, is not to be restricted except insofar as is necessitated by the prior art and by the spirit of the appended claims.

I claim as my invention:

1. In a system comprising a plurality of parallel-connected electrical machines and a regulator for controlling said machines, means for automatically transferring the control of the regulator from one to another of said machines in accordance with predetermined changes in a condition of the machines, and switching means for assigning to said control-transfer means any one of a plurality of different predetermined sequence programs.

2. The combination, with a system in which the control of a load-adjusting device is automatically transferred from one to another of a plurality of parallel-operated machines as the load carried by the machine under control is caused to change beyond given limits, of program-selecting means disposed to permit the system to be preset to follow any one of a plurality of predetermined transfer-operation-sequence programs.

3. In combination, a system comprising a plurality of electrical machines connected to a power circuit, load-control means for the machines, a selector device for assigning said load-control means to any one of said machines, means, responsive to predetermined changes in machine loading, for operating said selector device in accordance with a predetermined schedule and switching means disposed intermediate said selector device and the said several machines to permit the schedule of transfer operations to be changed at the will of an operator.

4. In combination, a system comprising a plurality of electrical machines connected to a power circuit, load-control means for the machines, a selector device for assigning said load-control means to any one of said machines, means, responsive to predetermined changes in machine loading, for operating said selector device and switching means disposed intermediate said selector device and the said several machines to permit the schedule of transfer operations to be changed at the will of an operator, said switching means comprising receptacle members connected with the selector device, similar receptacle members connected with the machines, and interchangeable plug devices for interconnecting said selector-receptacle member with the said machine-receptacle members.

5. In a system comprising a plurality of electrical machines connected to a power circuit, means for adjusting the load carried by each machine, control means for the machine-load-adjusting means, a selector device for connecting said control means to govern the load-adjusting means of any one of said machines, operating means for said selector device, means for so energizing said operating means when the load of the machine under control is caused to change beyond a given limit that transfer of the said control means to another machine will be effected in accordance with a predetermined program, and switching means disposed intermediate said selector device and the several machine-load-adjusting means for changing the sequence of transfer operations to establish a different predetermined program.

6. In a system comprising a plurality of electrical machines connected to a power circuit, means for adjusting the load carried by each machine, control means for the machine-load-adjusting means, a selector device for connecting said control means to govern the load-adjusting means of any one of said machines, operating means for said selector device, means for so energizing said operating means when the load of the machine under control is caused to change beyond a given limit that transfer of the said control means to another machine will be effected in accordance with a predetermined program, and switching means disposed intermediate said selector device and the several machine-load adjusting means for changing the sequence of transfer operations to establish a different predetermined program, said switching means comprising a set of receptacles connected with the selector device, a similar set of receptacles connected with the load-adjusting means of the machines, and interchangeable plug connectors for interconnecting the said selector and the said machine receptacles.

7. In a system comprising a plurality of parallel-operated machines, means for adjusting the load carried by each machine, control means for the machine-load-adjusting means, a selector device disposed to connect said control means to govern the load-adjusting means of any one of said machines, load-responsive contact-making means associated with each machine, operating means for the selector device, means whereby the selector device is further disposed to establish a connection from its operating means to the load-responsive means of the machine under control so that contact closure by these load-responsive means causes the selector device to transfer the connection of said control means to another machine in accordance with a predetermined program, the combination of switching means disposed intermediate said selector device and the load-adjusting and load-responsive means of the said several machines for changing the sequence of transfer operations to establish a different predetermined program.

8. In a system comprising a plurality of parallel-operated machines, means for adjusting the load carried by each machine, control means for the machine-load-adjusting means, a selector device disposed to connect said control means to govern the load-adjusting means of any one of said machines, load-responsive contact-making means associated with each machine, operating means for the selector device, means whereby the selector device is further disposed to establish a connection from its operating means to the load-responsive means of the machine under control so that contact closure by these load-responsive means causes the selector device to transfer the connection of said control means to another machine in accordance with a predetermined program, and switching means disposed intermediate said selector device and the load-adjusting and load-responsive means of the said several machines for changing the sequence of transfer operations to establish a different predetermined program, said switching means comprising receptacles connected with the selector device, similar receptacles connected with the load-adjusting and load-responsive means of the machines, and interchangeable plug connectors for interconnecting the said selector and the said machine receptacles.

9. In combination, a plurality of parallel-operated prime movers each of which has a plurality of input-control valves and a governor for controlling the valve openings, a regulator for adjusting the governor load settings, a multi-circuit selector switch having a plurality of positions of a number as great as the sum of the individual valve-load ranges, means for operating the switch from position to position, means, comprising contact members actuated in accordance with the position of each of the prime-mover valves, for controlling energization of the selector switch operating means, two of the circuits of the switch being connected with the regulator and two more with the switch-operating means, a sequence receptacle communicating with each of the different positions of the switches in a manner that for each of said positions of the switch the said regulator and switch-operating means circuits are connected to the particular receptacle to which that position corresponds, a machine receptacle connected with the contact members associated with each of the prime mover valves and with the governor of that prime mover, and interchangeable connector devices for interconnecting the sequence receptacle circuits with those of the machine receptacles in any manner desired to set up any one of a number of different transfer operation sequence programs which the said equipment will effect.

10. In a system of program-load control for a plurality of parallel-operated machines, a regulator for said machines, selector equipment disposed intermediate said regulator and the said several machines, and means whereby the selector equipment may, at the will of an operator, be reset to any one of a plurality of positions within an operating range.

11. In a system of program-load control for a plurality of parallel-operating machines, a regulator for said machines, selector equipment disposed intermediate said regulator and the said several machines, means for actuating said selector equipment from position to position, operating circuits for said actuating means, and means whereby the selector equipment may, at the will of an operator, be reset to any one of a plurality of positions within an operating range, said reset means comprising manually-operable control devices disposed to control the said operating circuits of the selector equipment actuating means.

In testimony whereof, I have hereunto subscribed my name this 11th day of April, 1932.

RENAN DE CAMP.